US006922385B2

(12) United States Patent  
Edwards

(10) Patent No.: US 6,922,385 B2  
(45) Date of Patent: Jul. 26, 2005

(54) TRACKING TECHNIQUES FOR HOLOGRAPHIC DATA STORAGE MEDIA

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/648,533

(22) Filed: Aug. 25, 2003

(65) Prior Publication Data

US 2004/0042375 A1 Mar. 4, 2004

Related U.S. Application Data

(63) Continuation of application No. 09/813,065, filed on Mar. 20, 2001, now Pat. No. 6,625,100.

(51) Int. Cl.$^7$ .................................................. G11B 7/00
(52) U.S. Cl. ...................................... 369/103; 369/288
(58) Field of Search .......................... 369/44.26, 44.35, 369/47.55, 53.2, 53.22, 53.23, 53.24, 53.37, 103, 121, 124.03, 275.3, 283, 284, 288

(56) References Cited

U.S. PATENT DOCUMENTS

| | | |
|---|---|---|
| 3,842,197 A | 10/1974 | Broussaud et al. |
| 4,948,968 A | 8/1990 | Matsui |
| 5,719,691 A | 2/1998 | Curtis et al. |
| 5,777,760 A | 7/1998 | Hays et al. |
| 5,812,288 A | 9/1998 | Curtis et al. |
| 5,838,650 A | 11/1998 | Campbell et al. |
| 5,874,187 A | 2/1999 | Colvin et al. |
| 5,917,798 A | 6/1999 | Horimai et al. |
| 5,978,112 A | 11/1999 | Psaltis et al. |
| 6,111,828 A | 8/2000 | McLeod et al. |
| 6,238,763 B1 * | 5/2001 | Sandstrom ................. 428/64.1 |
| 6,322,933 B1 | 11/2001 | Daiber et al. |
| 6,538,776 B2 | 3/2003 | Edwards |
| 6,611,365 B2 | 8/2003 | Edwards et al. |

FOREIGN PATENT DOCUMENTS

WO   WO 01/57602 A1   8/2001

OTHER PUBLICATIONS

Akedo et al., "High–precision detection method for the reference position in an optical encoder," Applied Optics, vol. 32, No. 13, May 1, 1993, pp. 2315–2319.

Psaltis et al., "Holographic storage using shift multiplexing," Optics Letters, vol. 20, No. 7, Apr. 1, 1995, pp. 782–784.

Pu et al., "High–density recording in photopolymer–based holographic three–dimensional disks," Applied Optics, vol. 35, No. 14, May 1996, pp. 2389–2398.

Barbastathis et al., "Shift multiplexing with spherical reference waves," Applied Optics, vol. 35, No. 14, May 1996, pp. 2403–2417.

Psaltis et al., "Holographic Data Storage," Computer IEEE, Feb. 1998, pp. 52–60.

(Continued)

*Primary Examiner*—Paul W. Huber  
(74) *Attorney, Agent, or Firm*—Eric D. Levinson

(57) ABSTRACT

In one embodiment, a holographic data storage medium includes a substrate, a holographic recording material, and an optically detectable tracking pattern on the medium. The substrate may have first and second substrate portions. The holographic recording material may be a photopolymer, and the medium may have a sandwiched construction, where the holographic recording material is sandwiched between the first and second substrate portions. The optically detectable tracking pattern may be replicated on at least one of the substrate portions. Alternatively, the optically detectable tracking pattern may be recorded as a holographic grating in the holographic recording material. The tracking pattern may facilitate the ability to pinpoint the location of the holographic bit maps on the holographic medium to within a fraction of a micron.

19 Claims, 11 Drawing Sheets

OTHER PUBLICATIONS

Dhar et al., "Holographic storage of multiple high–capacity digital data pages in thick photopolymer systems," Optics Letters, vol. 23, No. 21, Nov. 1, 1988, pp. 1710–1712.

Curtis et al., "High Density, High Performance Data Storage via Volume Holography: The Lucent Technologies Hardware Platform," Bell Laboratories, Lucent Technologies, pp. 1–9, published in 2000 by Holographic Data Storage, Ed. Coufal et al.

Ashley et al., "Holographic data storage," IBM J. Res Develop, vol. 44, No. 3, May 3, 2000, pp. 341–368.

* cited by examiner

Position Sensitive Detector (PSD)

TRACKING TECHNIQUES FOR HOLOGRAPHIC DATA STORAGE MEDIA

This application is a continuation of U.S. patent application Ser. No. 09/813,065, filed Mar. 20, 2001 now U.S. Pat. No. 6,625,100.

This invention was made with Government support under Agreement No. NMA202-97-9-1050 with the National Imagery and Mapping Agency of the United States Department of Defense. The Government has certain rights in this invention.

FIELD

The present invention relates to holographic data storage media.

BACKGROUND

Many different types of data storage media have been developed to store information. Traditional media, for instance, include magnetic media, optical media, and mechanical media to name a few. Increasing data storage density is a paramount goal in the development of new or improved types of data storage media.

In traditional media, individual bits are stored as distinct mechanical, optical, or magnetic changes on the surface of the media. For this reason, medium surface area may pose physical limits on data densities.

Holographic data storage media can offer higher storage densities than traditional media. In a holographic medium, data can be stored throughout the volume of the medium rather than the medium surface. Moreover, data can be superimposed within the same medium volume through a process called shift multiplexing. For these reasons, theoretical holographic storage densities can approach tens of terabits per cubic centimeter.

In holographic data storage media, entire pages of information can be stored as optical interference patterns within a photosensitive optical material. This can be done by intersecting two coherent laser beams within the optical material. The first laser beam, called the object beam, contains the information to be stored; and the second, called the reference beam, interferes with the object beam to create an interference pattern that can be stored in the optical material as a hologram. When the stored hologram is later illuminated with only the reference beam, some of the light of the reference beam is diffracted by the holographic interference pattern. Moreover, the diffracted light creates a reconstruction of the original object beam. Thus, by illuminating a recorded hologram with the reference beam, the data encoded in the object beam can be recreated and detected by a data detector such as a camera.

SUMMARY OF THE INVENTION

The invention relates to tracking techniques for tracking holographic bit map locations on holographic media, holographic media implementing the techniques, and holographic data storage systems implementing the techniques.

In exemplary embodiments, a holographic data storage medium includes a substrate, a holographic recording material, and an optically detectable tracking pattern on the medium. The substrate may include a first substrate portion and a second substrate portion that sandwich the holographic recording material in a sandwich construction. The substrate may be formed from glass, ceramic, acrylic, a thermoplastic material such as a polycarbonate, polymethylmethacrylate (PMMA), or amorphous polyolefin, or the like. The holographic recording material may comprise a photopolymer.

The optically detectable tracking pattern may comprise an optically detectable pattern on the substrate. Alternatively, the optically detectable tracking pattern may comprise a holographic grating stored in the holographic recording material. The holographic grating, for instance, may be prerecorded in the holographic recording material. In some embodiments, the optically detectable tracking pattern may comprise a combination of one or more optically detectable patterns on the substrate and one or more holographic gratings stored in the holographic material. The optically detectable tracking pattern, for instance, may define a grating of specified physical periodicity.

If the optically detectable tracking pattern comprises an optically detectable pattern on the substrate, the pattern may be replicated, i.e., stamped, mastered, embossed, etched, ablated, or the like. The pattern may have stepped changes in the grating period or may have periodic changes in the grating period. Alternatively, the pattern may be defined by a beat frequency of at least two grating periods. Similarly, if the optically detectable tracking pattern comprises a holographic grating stored in the holographic recording material, the tracking pattern may comprise a holographic grating having stepped changes in the grating period or periodic changes in the grating period, or may be defined by a beat frequency of at least two grating periods. The holographic tracking pattern can be optically written within the holographic recording material.

In some embodiments, a holographic data storage system includes a laser that produces at least one laser beam and optical elements through which the laser beam passes. The system may further include a data encoder that encodes data in at least part of the laser beam and a holographic recording medium that stores at least one hologram. The holographic recording medium may include an optically detectable tracking pattern. The system may also include a data detector that detects the hologram, and a tracking detector that detects light diffracted by the optically detectable tracking pattern. The data encoder may be a spatial light modulator and the data detector may be a camera. The recording medium may be a disk shaped medium that is rotated relative to the other components or a card shaped medium that is translated, e.g., in x-y coordinates, relative to the other components.

The tracking detector may comprise a position sensitive detector, a segmented detector, a two-element photodetector, or the like. The holographic medium that forms part of the holographic data storage system may include one or more of the features described above.

In other embodiments, a method of determining a location on a holographic medium includes interrogating the holographic medium with light, and detecting the diffracted light. The angle of diffraction of the diffracted light may be used to indicate a position on the medium. For instance, the angle of diffraction may depend on the wavelength of light used to interrogate the medium, and on the period of the optically sampled grating. As such, the measured diffraction angle may be used to indicate particular positions on the medium. The medium may be a disk-shaped holographic medium or a card shaped holographic medium. Interrogating the holographic medium with light may comprise interrogating the disk with a probe beam, or alternatively may comprise interrogating the disk with the holographic reference beam. In either case, the beam may move radially or tangentially across the disk. In this manner, a track location defined by a particular diffraction angle of the diffracted light can be located with precision.

Additional details of these and other embodiments are set forth in the accompanying drawings and the description below. Other features, objects and advantages will become apparent from the description and drawings, and from the claims.

DETAILED DESCRIPTION

Figure 1:
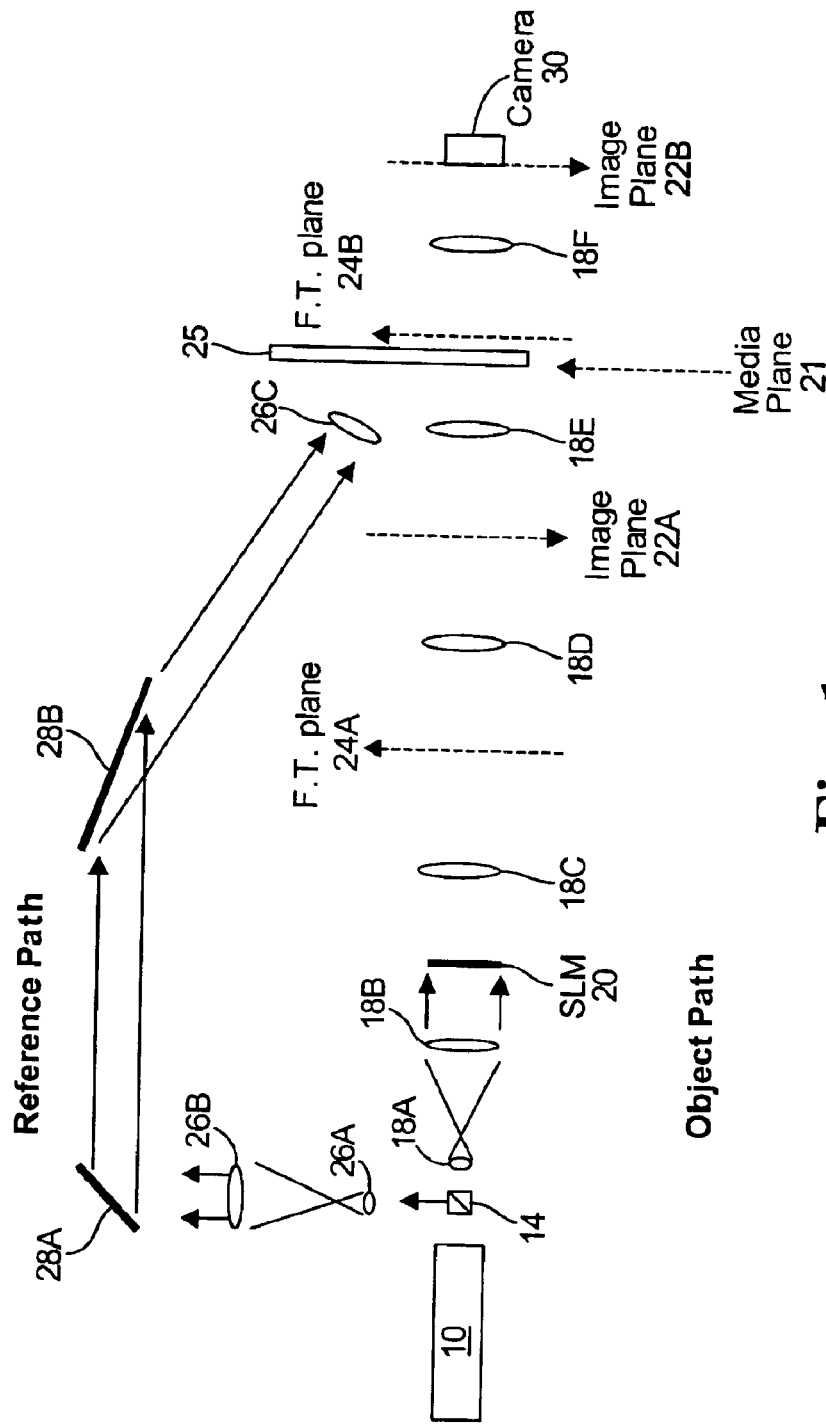
FIG. 1 illustrates a conventional optical arrangement for holographic recording.

FIG. 1 illustrates a conventional optical arrangement for holographic recording. As will be described in detail below, the arrangement of FIG. 1, or other optical arrangements, can benefit from tracking techniques in accordance with the invention. As shown in FIG. 1, laser 10 produces laser light that is divided into two components by beam splitter 14. These two components generally have an approximately equal intensity and may be spatially filtered to eliminate any optical wave front errors.

The first component exits beam splitter 14 and follows an object path. This "object beam" may then pass through a collection of object beam optical elements 18A–18E and a data encoder such as a spatial light modulator (SLM) 20. For instance, lens 18A may expand the laser light and lens 18B may condition the laser light so that the photons are traveling substantially parallel when they enter SLM 20.

Figure 2:
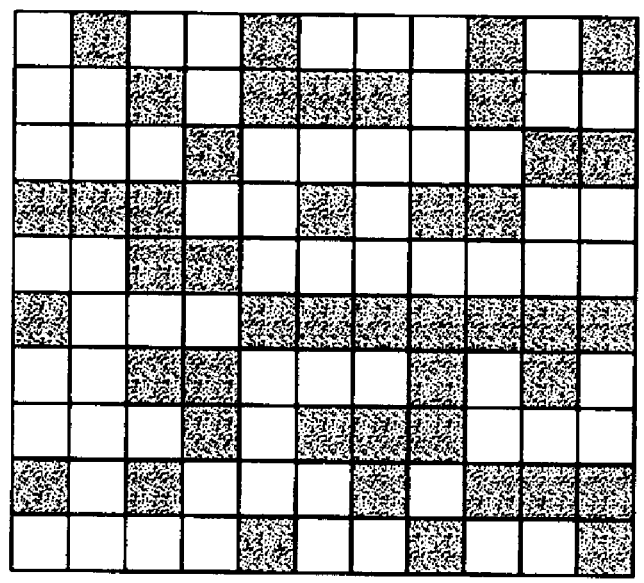
FIG. 2 is an enlarged view of an exemplary 10 by 10 bit pixel array that can be stored on a holographic medium as a hologram.

SLM 20 may encode data in the object beam, for instance, in the form of a holographic bit map (or pixel array). FIG. 2, for instance, shows an enlarged view of an exemplary 10 by 10 bit pixel array. The encoded object beam may pass through lenses 18C, 18D, and 18E before illuminating a holographic recording media plane 21. In this conventional "4F" configuration, lens 18C is located one focal length from SLM 20 and one focal length from Fourier transform plane 24A. Lens 18D is located one focal length from Fourier transform plane 24A and one focal length from image plane 22A. Lens 18E is located one focal length from image plane 22A and one focal length from Fourier transform plane 24B.

The second component exits the beam splitter 14 and follows a reference path. This "reference beam" may refract or reflect off reference beam optical elements such as lenses 26 and mirrors 28. The reference beam illuminates the media plane 21, interfering with the object beam to create a hologram on medium 25. By way of example, medium 25 may take the form of a disk shaped medium or a card shaped medium.

In order to provide increased storage density, storage medium 25 is typically located in proximity to one of the Fourier transform planes. Using this system, the data encoded in the object beam by SLM 20 is recorded in medium 25 by simultaneously illuminating both the object and reference paths.

After a hologram has been stored on the medium 25, the data encoded in the hologram may be read by the system. For readout of the data, only the reference beam is allowed to illuminate the hologram on medium 25. Light diffracts off the hologram stored on medium 25 to reconstruct or "recreate" the object beam, or a beam of light that is substantially equivalent to the original encoded object beam. This recreated object beam passes through lens 18F permitting a reconstruction of the bit map that was encoded in the object beam to be observed at image plane 22B. Therefore, a data detector, such as camera 30 can be positioned at image plane 22B to read the data encoded in the hologram.

The holographic bit map encoded by SLM 20 comprises one "page" of holographic data. For instance, the page may be an array of binary information that is stored in a particular location on the holographic medium as a hologram. By way of example, a typical page of holographic data may be 1000 bit by 1000 bit pixel array that is stored in 1 square millimeter of medium surface area, although the scope of the invention is not limited in that respect. Because holographic data is stored throughout the medium volume, however, sequential pages may be overlapped in the recording process by a process called shift multiplexing.

Figure 3:
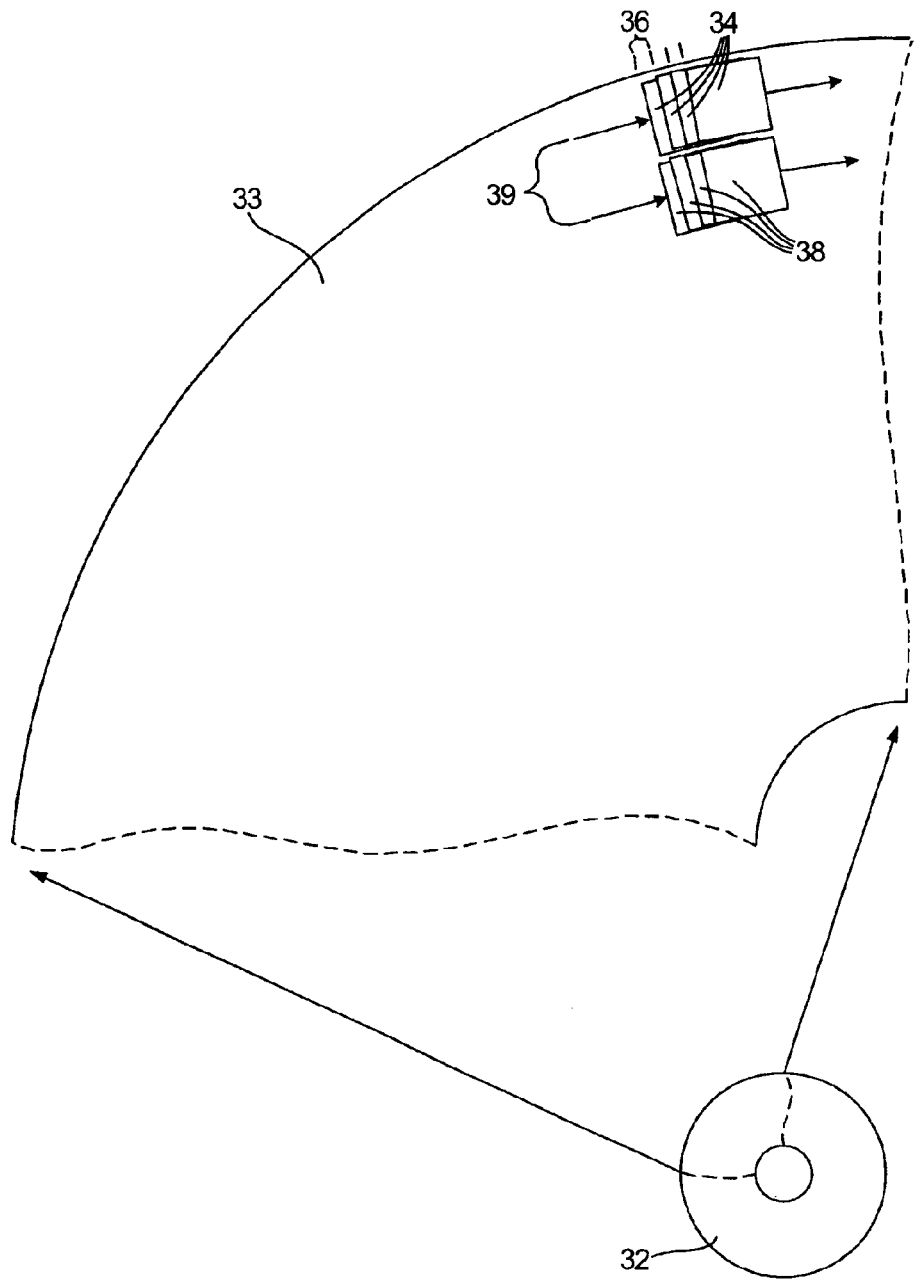
FIG. 3 illustrates how sequential pages or pixel arrays may be stored on a holographic data storage medium.

In one type of shift multiplexing of holographic data pages, sequential pages are recorded at shifted locations around the medium. The shift distances are typically much less than the recorded area in one dimension (the down-track dimension) and approximately equal to the recorded area in the other dimension (the cross-track dimension). FIG. 3, for example, illustrates how sequential pages may be stored on medium 32. A portion 33 of medium 32 is enlarged for illustrative purposes. As shown, sequential pages of data 34 are overlapped in the down-track dimension 36. Later pages 38 in the sequence of pages also overlap one another in the down-track dimension 36 but do not overlap pages in the cross-track dimension 39. The respective pages of data, for instance, may each cover approximately 1 square millimeter of surface area on the medium. The down-track dimension, for instance may be approximately 10 microns, while the cross-track dimension may be approximately 1 millimeter.

In an alternative type of shift multiplexing, sometimes referred to as phase correlation multiplexing, sequential pages are overlapped in the recording process in both the cross track dimension and the down track dimension.

After holographic data pages have been recorded on a holographic medium, readout of the respective pages requires the optics of the holographic recording system to accurately locate or "pinpoint" the holographic pages to within a fraction of a micron, e.g., approximately 0.3 microns. Traditional optical data storage disks have cross-track dimensions on the order of one micron, and require sub-micron tracing precision for a dynamically moving medium. In contrast, track and page locations on a holographic data storage medium can be relatively sparse, and in the case of a holographic disk, the holographic disk may rotate much more slowly than a traditional optical disk. For these reasons, sub-micron tracking precision for a holographic medium can be extremely challenging.

In the past, holographic storage tracking systems have relied on precision encoder feedback in the recording/reading system and "captive" media. The media is referred to as "captive" because the tracking system mandated that a medium could not be removed from the system and then re-read without a tedious trial and error search of the medium surface. Holographic data storage systems having removable media capabilities, however, are highly desirable, and thus dictate that the precision encoder functionality be transcribed onto the medium.

Several embodiments of the invention are described below. The embodiments enable a holographic system to precisely locate track locations on a holographic medium. The embodiments may be adapted accordingly to define track or page locations in any desired dimension of a medium, e.g., tangentially or radially on a disk shaped medium. The accuracy of a system implementing these embodiments may enable the location of tracks on a holographic medium to within sub-micron accuracy. Moreover, the sub-micron accuracy can be maintained even if the medium is not dynamically moving. In addition, media may be removable in a system implementing these embodiments.

Figure 4A:
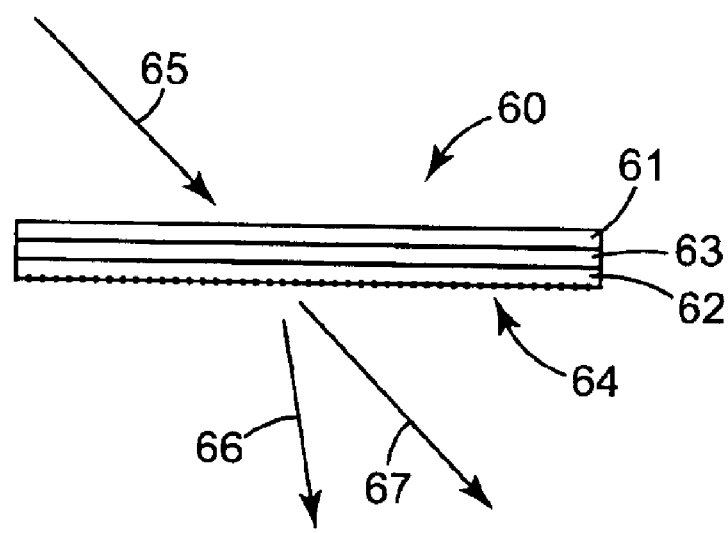
FIGS. 4A and 4B illustrate exemplary holographic data storage media in accordance with embodiments of the invention.
Figure 4B:
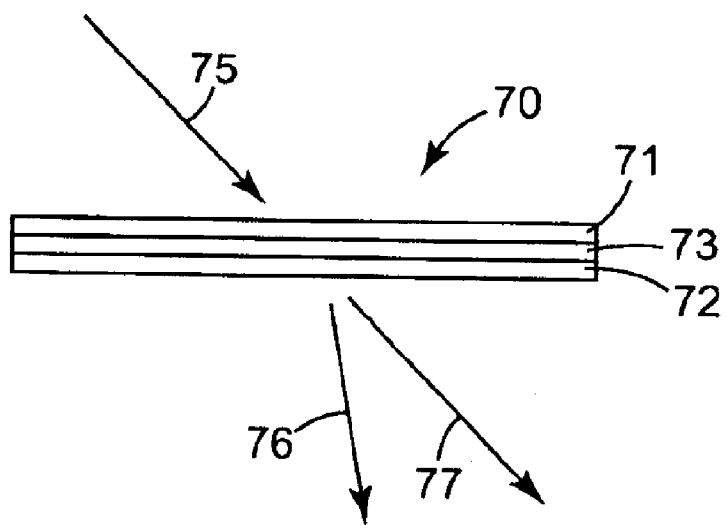

FIGS. 4A and 4B illustrate exemplary holographic data storage media in accordance with embodiments of the invention. Both FIGS. 4A and 4B illustrate media having a sandwich construction. For instance, media 60, 70 include a substrate having a first substrate portion 61, 71 and a second substrate portion 62, 72. Holographic recording material 63, 73 may comprise a photopolymer that is sandwiched between the respective substrate portions.

In FIG. 4A, at least one substrate portion (e.g., 62) includes physical surface variations 64. The physical surface variations 64 can be replicated, i.e., mastered, embossed, stamped, etched, ablated, or the like, onto substrate portion 62. The physical surface variations 64 may be optically detectable. In other words, the physical surface variations 64 may optically affect light that interrogates medium 60, e.g., through transmitted or reflected diffraction. For instance, a probe beam 65 may interrogate medium 60 and physical surface variations 64 may cause at least some of the light of the probe beam 65 to be diffracted. Thus, both diffracted light 66 and undiffracted light 67 may emerge from the medium 60 when the medium is interrogated with probe beam 65.

In FIG. 4B, the holographic recording material 73 is pre-recorded with an interferometric pattern. The interferometric pattern may be a holographic grating that is stored in the holographic recording material in addition to data encoded bit map holograms. The interferometric pattern may be optically detectable. For instance, the interferometric pattern may optically affect light in a manner that is similar to ways embodiments of FIG. 4A optically affect light. A probe beam 75 may interrogate medium 70 and both diffracted light 76 and undiffracted light 77 may emerge from medium 70. However, because the interferometric pattern is stored in holographic recording material 73 (rather than on the substrate as shown in FIG. 4A), the data storage capacity of medium 70 may be compromised.

In FIGS. 4A and 4B, the diffracted light 66, 76 and the undiffracted light 67, 77 may be detected to accurately locate the location of the probe beam. For instance, as described in detail below, either the physical surface variations 64 of medium 60, or the interferometric pattern of medium 70 may be adapted to diffract light in a manner that defines the location of probe beam 65, 75. By way of example, the intensities, relative intensities, diffraction angles, relative diffraction angles, or any combination of intensities or diffraction angles between diffracted light 66, 76 and undiffracted light 67, 77 may be detected to accurately locate the location of probe beam 65, 66. In some embodiments, little or no light is undiffracted, but the undiffracted light paths defined by light 67 and 77 provide references that define the diffraction angles of diffracted light 66, 76.

One problem that can arise when using optical tracking methods for a holographic medium relates to noise. A holographic data recording system, for instance, may have a data detector that is used to detect holographic bit maps stored on the medium. Light diffracted by tracking patterns, however, may contribute to noise, if seen by the data detector. Thus, whether the medium is adapted to diffract a probe beam or the reference beam, the diffraction angle of the diffracted light may need to be large enough to ensure that light diffracted by the tracking pattern is not collected by the data detector that is used to detect the data encoded bit map holograms.

To ensure that readout is not negatively impacted by optical tracking elements, the medium can be adapted such that light diffracted for tracking purposes is diffracted away from light diffracted for readout purposes. In addition, the system may be configured such that undiffracted light does not negatively impact readout collection optics. In general, the system design variables of tracking beam orientation, the position of readout collection optics such as lenses and a camera, and diffraction angles defined by tracking patterns can all affect whether tracking light gets directed towards the readout collection optics. Considering these design variables, the whole system should be configured so that readout is not negatively impacted by the use of optical tracking patterns.

One or more of the embodiments are based on sensing the transition positions between bands of differing grating periodicity. The grating may be recorded on the medium in any desired dimension to define track locations in that dimension. Again, the precise transition positions may be optically defined by either physical surface variations (as shown in FIG. 4A) or by holographic interferometric patterns (as shown in FIG. 4B). The transition positions can be detected and accurately located by interrogating the medium with a probe beam and detecting the diffracted light and/or undiffracted light. Alternatively, transition positions can be detected and accurately located by interrogating the medium with the reference beam and detecting the light that diffracts according to either optical surface variations or a holographic interferometric pattern.

In some embodiments, the medium is adapted to diffract light in a stepwise manner to define track locations. The stepwise changes can be pre-recorded for tracking purposes, e.g., in a cross-track dimension or down track dimension. The stepwise changes can be detected using the reference beam of the holographic system. However, it may be more advantageous to implement a separate probe beam, i.e., separate from the object and reference beams. For instance, in an embodiment relating to FIG. 4A, the probe beam could be chosen to have a wavelength such that the recording material 63 is insensitive to the probe beam. By way of example, a 680 nanometer probe beam laser could be used when the recording material 63 is 532 nanometer sensitive material (e.g., "green sensitive material"). In addition, the spot size for the separate probe beam could be varied to create an optimal tracking signal.

Figure 5:
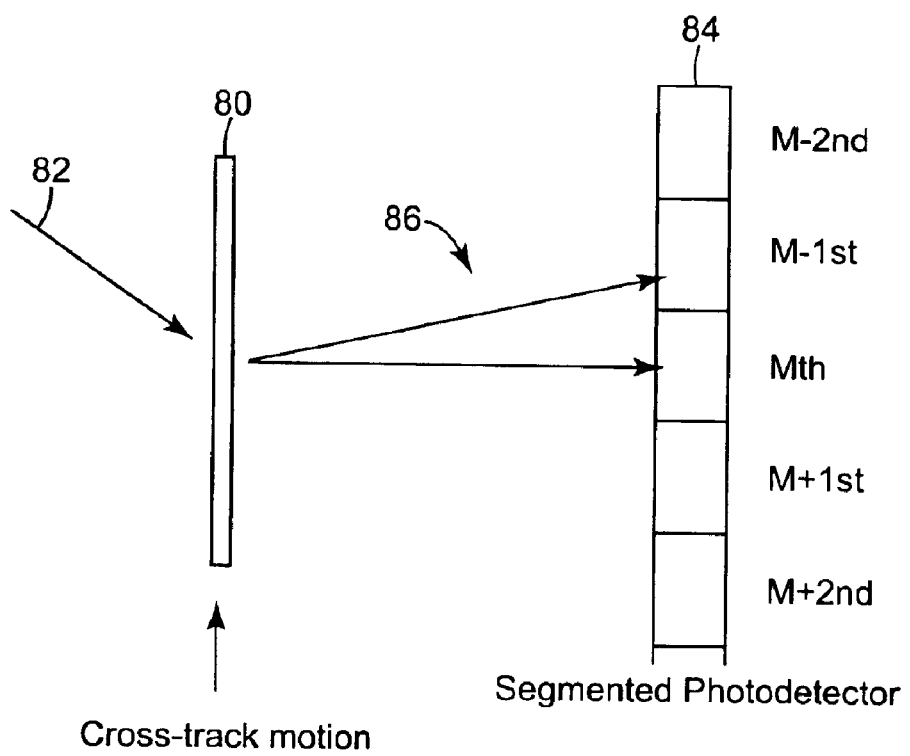
FIG. 5 illustrates how diffracted light may be detected by a segmented photodetector.
Figure 6:
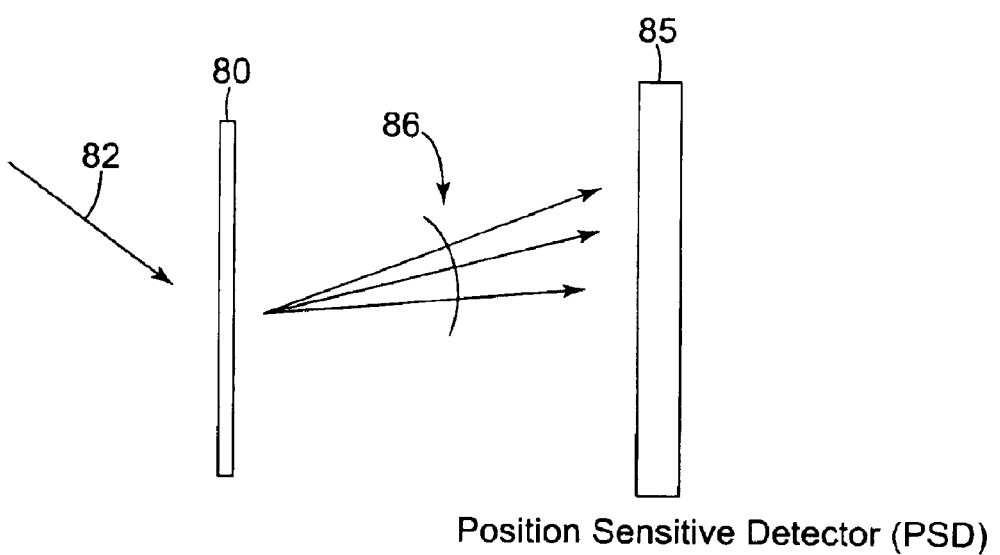
FIG. 6 illustrates how diffracted light may be detected by a position sensitive detector.

FIG. 5 illustrates medium 80 interrogated with probe beam 82. A detector, such as a segmented photo detector 84 or a position sensitive detector (PSD 85 as shown in FIG. 6) is positioned to detect diffracted light 86. As probe beam 82 scans across the transition region between one grating period and another, the diffracted light shifts diffraction angles. Track position, for instance, can be accurately located at the transition by a comparison of signals from adjacent segments of a multi-element detector. Grating patterns of specified period may be recorded across a radial dimension of the medium, a tangential dimension, or both.

The differing track positions can either be detected differentially, with a segmented detector array (as shown in FIG. 5), or alternatively the differing track positions can be compared with an analog target voltage by a position sensitive detector (PSD) (see FIG. 6). In the case of the segmented detector (as shown in FIG. 5), diffraction grating periods can be chosen such that diffracted displacements from adjoining steps are a fixed distance apart in the detection plane. In other words, the grating can be chosen to vary according to the detector configuration.

The location on the holographic disk can be determined by the status of the different photodetector signals in the photodetector array. For instance, an individual element (M) with high signal level may indicate that the optics are between tracks N and N+1. A balanced signal level between two adjoining detectors (e.g., M and M+1) may indicate that the optical system is precisely on track N. In the case of a PSD, the monitored position voltage varies in a step-wise fashion.

Figure 7:
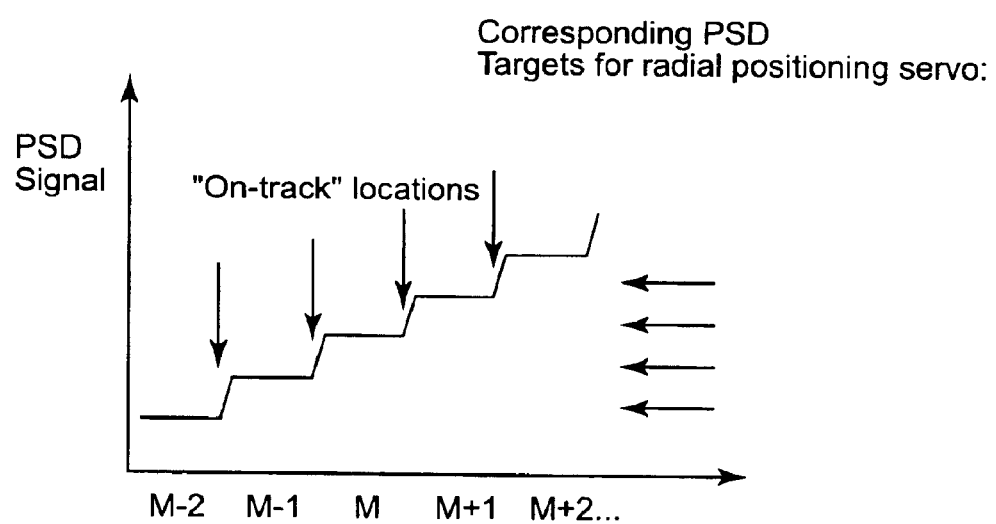
FIG. 7 is a graph of signal strength as a function of track location in accordance with an embodiment of the invention.

FIG. 7 illustrates an exemplary graph of PSD signal level graphed as a function of track location. As shown, the signal level may increase in a stepwise fashion. However, between the steps at positions corresponding to the grating period transitions, signal level may increase very quickly in a linear or substantially linear fashion. Defined points between successive steps may define targets for a radial positioning servo, or alternatively may define targets for a tangential positioning servo. For example, the halfway point between successive steps could be used. In that case, PSD signal strength halfway between M and M+1 values would correspond to the target radial positioning for track N. Similarly, PSD signal strength half-way between M and M−1 values could correspond to the target radial positioning for track N−1, and so forth.

In other embodiments, the medium may include a grating with a periodically varying pitch that diffracts light to define track locations. A periodic variation of the grating period, e.g., a sawtooth function, can be replicated on the substrate of the holographic medium, e.g., as shown in FIG. 4A. Alternatively, the grating having a periodic variation of the period may be an interferometric pattern that is stored within the holographic recording material of a holographic recording medium, e.g., as shown in FIG. 4B.

The techniques for the periodic variation of the period embodiments are based on the sensing of diffraction angle (s). For example, a track position may be sensed by either a particular diffraction angle or a ratio of the light intensity from two diffraction angles. The maximum or minimum diffraction angles, for instance, may define track locations, or alternatively, the halfway points between the maximum and minimum diffraction angles may define track locations.

Like some of the other embodiments, either a PSD (as shown in FIG. 6) or a segmented photodetector (as shown in FIG. 5) may be implemented to accurately locate track locations. For instance, for a disk shaped holographic medium, the periodic variation of the grating period may be pre-recorded tangentially (i.e. perpendicular to the cross-track dimension of the disk shaped medium), radially (i.e., perpendicular to the down track dimension of the disk shaped medium), or both. For example, approximately 1 millimeter cycles of grating periodicity may be prerecorded across the holographic disk radius.

Again, like other embodiments, the variation of the grating period may be detected (via diffraction angles) using the reference beam for the holographic system. Alternatively, a separate probe beam may be used. The separate probe beam can be chosen to have a wavelength such that the photopolymer recording material is insensitive to the probe beam. Furthermore, the spot size for the probe beam could be varied for optimization.

Figure 8:
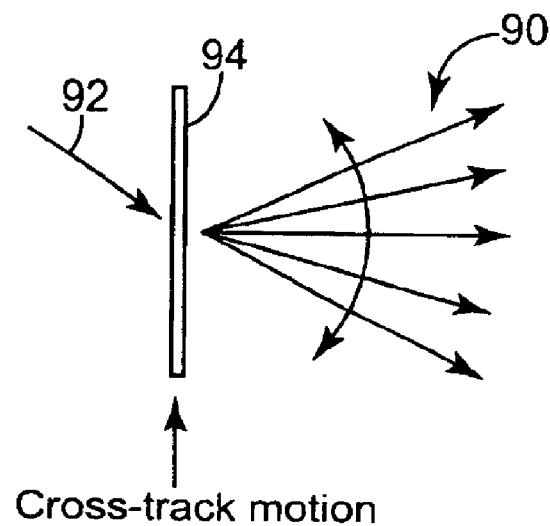
FIG. 8 illustrates how a diffracted beam may cycle in accordance with an embodiment of the invention.
Figure 9:
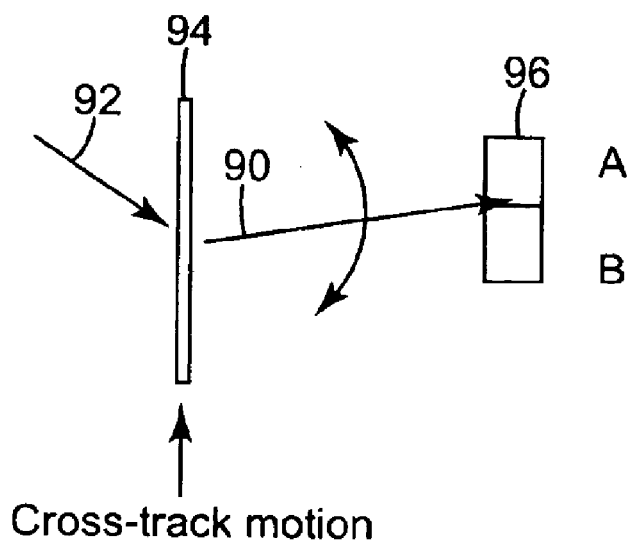
FIG. 9 illustrates how diffracted light may be detected by a two element photodetector.

The probe beam may scan across medium 94, and as it does so, the diffraction angle detected by the detector may change according to the period of the grating on the medium. FIG. 8, for example, shows how a diffraction angle of a diffracted beam 90 may cycle as a probe beam 92 moves across the radius of medium 94 that has been prerecorded with a grating that has a periodic cycle of grating period across the cross-track dimension of the medium 94. FIG. 9 shows a detector 96 in the form of a two-element photodetector implemented to detect diffracted light for the purpose of accurately locating track locations on medium 94.

In the periodic cycles of grating period embodiment, the diffracted light may not independently define which track location is being pinpointed on the medium. Rather, the diffracted light may simply locate a track location. To determine which track location has been located, the system may implement a memory device to count the number of track locations that have been identified in a scanning process. The probe beam, for instance, may scan the radial dimension of the medium. The probe beam may begin at the inner diameter or the outer diameter of the medium in the case of a disk shaped medium, and may scan across the radial dimension of the medium, accounting for the track locations it encounters. Alternatively, if the medium is prerecorded with a grating perpendicular to the cross track dimension, the probe beam may scan across the medium tangentially.

As light is diffracted when the probe beam scans across the periodic cycles of grating period, the diffracted light cycles through a defined range of diffraction angles (as shown in FIG. 8). Any particular diffraction angle may be used to define the track location. For instance, the largest angle or the smallest angle may be used. As shown in FIG. 9, a simple two element photodetector 96 is positioned at a defined location relative to the medium 94 and probe beam 92 so that track location is defined when equal amounts of diffracted light is detected by each element of the two element photodetector 96. By way of example, the photodetector in FIG. 9 is positioned at the halfway point between a maximum and minimum diffraction angle, although the invention is not limited in that respect.

In still other embodiments, the medium may include beat frequency gratings that diffract light to define track locations. Again, the beat gratings may be replicated on the substrate of the holographic medium, e.g., as shown in FIG. 4A. In addition, the beat gratings may be interferometric patterns stored on the holographic recording material of a holographic recording medium, e.g., as shown in FIG. 4B. Moreover, a combination of surface variations and interferometric patterns may define the beat gratings on the medium.

Figure 10:
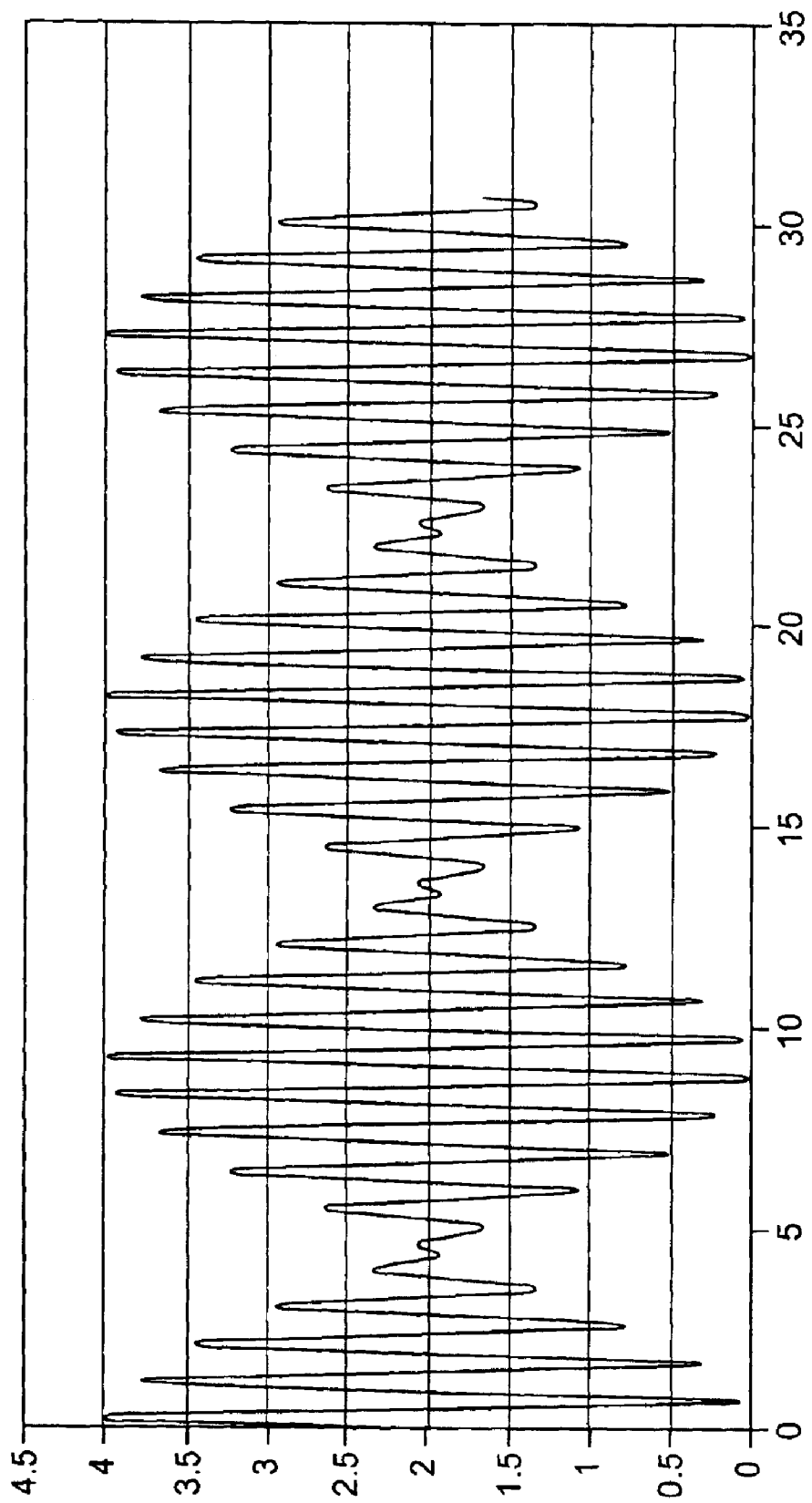
FIG. 10 is a graph illustrating the addition of two similar frequency oscillations and their beat frequency.

In the beat frequency embodiments, at least two grating frequencies are superimposed on the holographic medium. The grating frequencies are chosen such that their "beat frequency," i.e., spatial frequency between phase synchronization of the grating frequencies, is equal to the desired data track pitch. FIG. 10 is a graph illustrating the addition of two similar frequency oscillations and their beat frequency. The two components for this example are in phase at 0, 9, 18, and 27 to constructively interfere. Conversely, the two components for this example are out of phase at 4.5, 13.5 and 22.5 to deconstructively interfere.

For example, an illustrative case of 30 grating synchronization points separated by about 1 mm would require:

$$m\Lambda1=(m+1)\Lambda2 \approx 1000 \text{ microns} \tag{A}$$

(where $\Lambda1$, $\Lambda2$ are the component grating periods)
This implies:

$$m(\Lambda1-\Lambda2)=\Lambda2 \tag{B}$$

Assuming a set 10 nanometer differential in the grating periods, then (B) implies $$m(10 \text{ [nm]})=\Lambda2,$$

and $$m(10 \text{ [nm]})(m+1) \approx 1000 \text{ microns}=1,000,000 \text{ nm}$$

Thus:

$$m=316 \quad m+1=317$$

$$\Lambda1=3.17 \ \mu m \quad \Lambda2=3.16 \ \mu m$$

With these two periods (3.16 $\mu$m, 3.17 $\mu$m) the grating will have a beat frequency of $$m \ \Lambda1=(m+1)\Lambda2=1001.72 \ \mu m \approx 1 \text{ mm}$$

Figure 11:
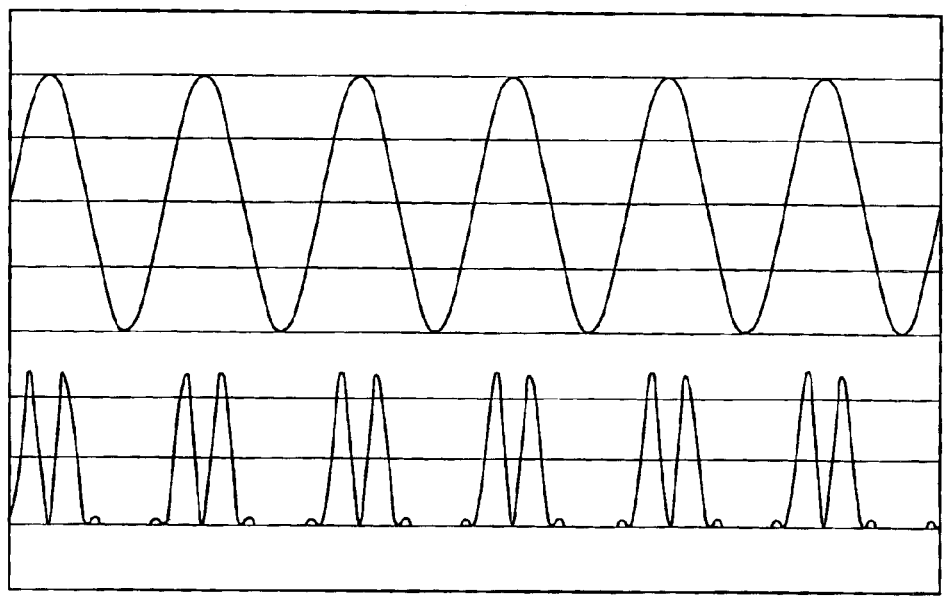
FIG. 11 illustrates 1st and 2nd order diffraction intensity for 6 cycles of a beat frequency grating.

With the beat frequency grating incorporated in the media, the diffraction efficiencies may vary (with periodicity of the grating beat frequency) as track position changes. FIG. 11 illustrates 1st and 2nd order diffraction intensity for 6 cycles of the beat frequency grating.

Again, like other embodiments, the beat frequency may be detected (via diffraction angles) using the reference beam for the holographic system. Alternatively, a separate probe beam may be used. The separate probe beam can be chosen to have a wavelength such that the photopolymer recording material is insensitive to the probe beam. Furthermore, the spot size for the probe beam could be varied for optimization. The probe beam may scan across medium either radially or tangentially, depending on the implementation, and as it does so, the diffraction angle detected by the detector may change according to the beat frequency on the medium.

Some implementations of the tracking methods may implement a focused probe beam with focused spot size. Sensitivity to track mis-registration may determine how focused the probe beam and spot size have to be. In practice, the solid angle projections of the 1st order diffractions from two neighboring regions may overlap and interfere with each other. Thus, the system may be adapted to account for the interference. For instance, a detector may be positioned at a plane of interference to sense grating transitions.

Figure 12:
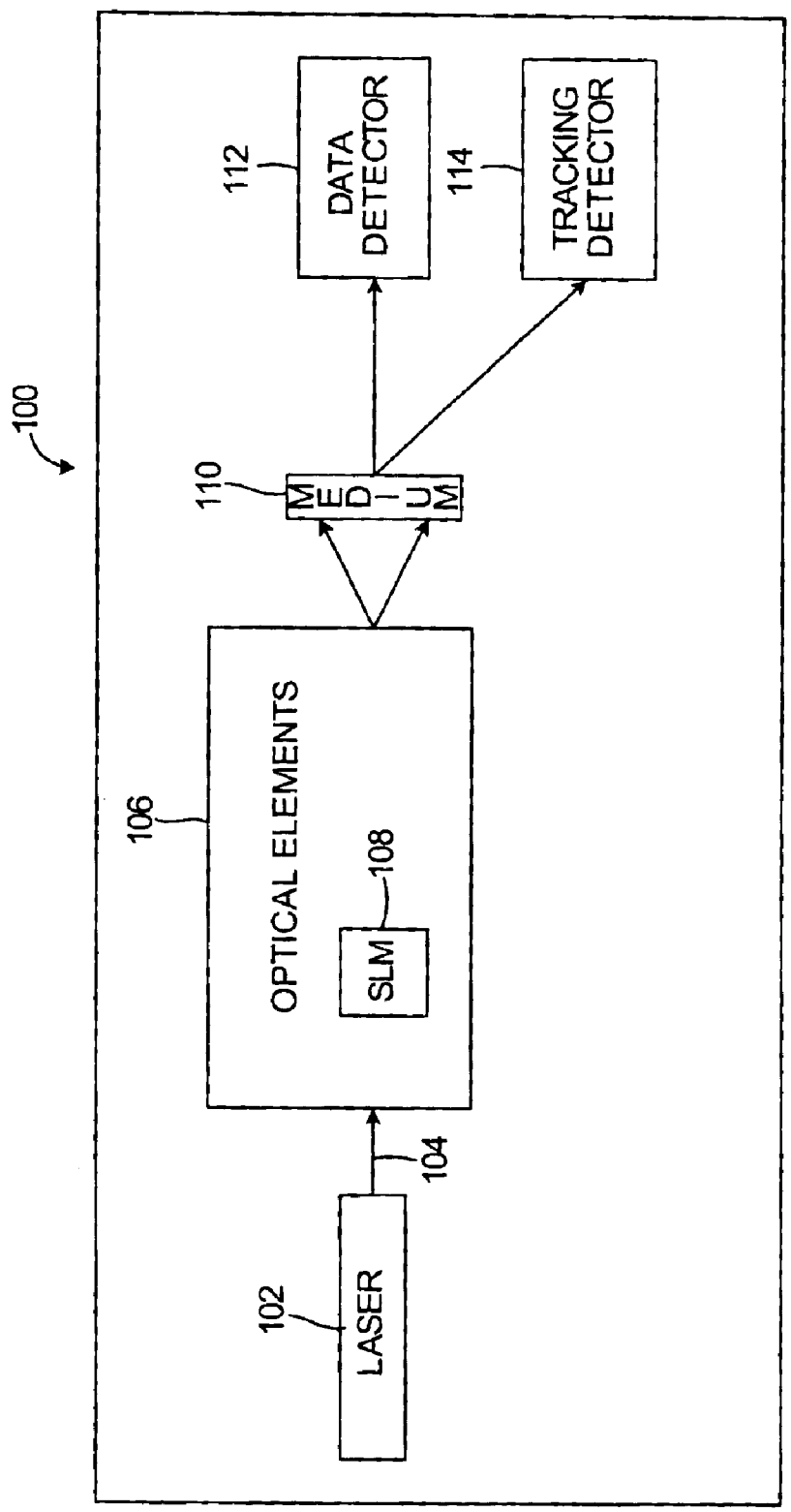
FIG. 12 is a block diagram of a system suitable for implementing tracking techniques in accordance with embodiments of the invention.

FIG. 12 illustrates a system 100 suitable for implementing tracking techniques. System 100 includes at least one laser 102 that produces laser light 104. Laser light 104 passes through optical elements 106. For instance, optical elements 106 may include one or more beam splitters, lenses and mirrors. A data encoder, such as SLM 108 may be positioned within the optical elements to encode data in the laser light 104. By way of example, the optical elements 106 may conform to the optical arrangement shown in FIG. 1, although the scope of the invention is not limited in that respect. Medium 110 is positioned where it can be written with holographic bit maps. Data detector 112 such as a camera is positioned to detect data encoded bit maps on medium 110. Tracking detector 114 such as a PSD, a segmented detector array, a two-element photodetector or the like, is positioned to detect light diffracted from medium 110 in a manner that enables system 100 to accurately locate track location on medium 110.

In the system, at least one laser 102 may be carried on a record/read head (not shown). Additional lasers (not shown) may also be carried on the record/read head. Tracking information, for instance, provided by the tracking detector 114 may be used to control the positioning of the record/read head. In this manner, laser 102 may be properly positioned to read and write holograms on the medium 110.

Various embodiments of the invention have been described. For example, numerous different tracking techniques have been described for holographic data storage media. The techniques may be implemented to realize removable holographic media. Moreover, a system implementing the techniques may locate the location of the holographic pages on a holographic medium to within a fraction of a micron. The holographic medium may be any type of holographic medium such as a holographic disk, a non-disk shaped holographic medium, or a holographic data storage cartridge having holographic tape. For instance, if the medium is a non-disk shaped medium or a cartridge having holographic tape, the gratings used for tracking purposes may be prerecorded across defined dimensions of the medium, such as horizontal and vertical dimensions, to define track locations in those dimensions. These and other embodiments are within the scope of the following claims.

What is claimed is:

1. A holographic data storage medium comprising:
   a first substrate portion;
   a second substrate portion;
   a holographic recording material sandwiched between the first and second substrate portions; and
   an optically detectable tracking pattern formed one surface of at least one of the substrate portions, wherein the optically detectable tracking pattern comprises a pattern formed on the surface of at least one of the substrate portions to define a periodic cycle of grating period.

2. The holographic data storage medium of claim 1, wherein the optically detectable tracking pattern formed on the surface of at least one of the substrate portions comprises an optically detectable tracking pattern formed on a surface of the medium.

3. The holographic data storage medium of claim 1, wherein the first and second substrate portions comprise thermoplastic material and the optically detectable tracking pattern comprises a replicated pattern on the surface of at least one of the substrate portions.

4. A holographic data storage medium comprising:
   a first substrate portion;
   a second substrate portion;
   a holographic recording material sandwiched between the first and second substrate portions; and an optically detectable tracking pattern formed on a surface of at least one of the substrate portions, wherein the optically detectable tracking pattern comprises a grating pattern formed on the surface of at least one of the substrate portions to define stepped changes in grating period.

5. A holographic data storage medium comprising:
a first substrate portion;
a second substrate portion;
a holographic recording material sandwiched between the first and second substrate portions; and
an optically detectable tracking pattern formed on a surface of at least one of the substrate portions, wherein the optically detectable tracking pattern is defined by at least two grating patterns formed on the surface of at least one of the substrate portions to define a beat frequency.

6. A holographic data storage system comprising:
a holographic medium comprising a first substrate portion, a second substrate portion, a holographic recording material sandwiched between the first and second substrate portions, and an optically detectable tracking pattern formed on a surface of at least one of the substrate portions;
a reference beam to reconstruct a hologram stored in the holographic recording material; and
a probe beam to diffract off the optically detectable tracking pattern.

7. The holographic data storage system of claim 6, wherein the probe beam has a wavelength and the holographic recording material is insensitive to the wavelength of the probe beam.

8. The holographic data storage system of claim 6, further comprising a tracking detector to detect diffracted light associated with the probe beam.

9. The holographic data storage system of claim 6, further comprising a data detector to detect the reconstructed hologram.

10. The holographic data storage system of claim 6, wherein the optically detectable tracking pattern formed on the surface of at least one of the substrate portions comprises an optically detectable tracking pattern formed on a surface of the medium.

11. The holographic data storage system of claim 6, wherein the tracking pattern comprises a pattern formed on the surface of at least one of the substrate portions to define a periodic cycle of grating period.

12. The holographic data storage medium of claim 6, wherein the tracking pattern comprises a grating pattern formed on the surface of at least one of the substrate portions to define stepped changes in grating period.

13. The holographic data storage medium of claim 6, wherein the tracking pattern is defined by at least two grating patterns formed on the surface of at least one of the substrate portions to define a beat frequency.

14. A method of determining a location on a holographic medium including a substrate and a holographic recording material comprising:
interrogating the holographic medium with a probe beam, wherein the holographic recording material of the holographic medium is insensitive to the probe beam; and
detecting diffracted light associated with the probe beam, the diffracted light being diffracted by a substrate of the medium to indicate a position on the medium.

15. The method of claim 14, wherein interrogating the holographic medium with the probe beam comprises moving the probe beam across a radial dimension of the medium, the method further comprising locating a track location on the medium, the track location being defined by a diffraction angle of the diffracted light associated with the probe beam.

16. The method of claim 14, wherein interrogating the holographic medium with the probe beam comprises moving the probe beam across a tangential dimension of the medium, the method further comprising locating a track location on the medium, the track location being defined by a diffraction angle of the diffracted light associated with the probe beam.

17. The method of claim 14, wherein the holographic data storage medium includes a first substrate portion, a second substrate portion, the holographic recording material sandwiched between the first and second substrate portions, and an optically detectable tracking pattern formed on a surface of at least one of the substrate portions.

18. The method of claim 17, wherein the optically detectable tracking pattern formed on the surface of at least one of the substrate portions comprises an optically detectable tracking pattern formed on a surface of the medium.

19. The method of claim 14, wherein interrogating the holographic medium with a probe beam includes interrogating the probe beam through the holographic medium.

* * * * *